United States Patent
Martino-Gonzalez et al.

(10) Patent No.: US 11,541,983 B2
(45) Date of Patent: Jan. 3, 2023

(54) METHOD FOR MANUFACTURING A MULTI-SPAR BOX WITH A CONTINUOUS SKIN UPPER SHELL OF A TAIL CONE SECTION FOR A REAR END OF AN AIRCRAFT AND A COMPOSITE ASSEMBLY

(71) Applicant: Airbus Operations S.L., Getafe (ES)

(72) Inventors: Esteban Martino-Gonzalez, Getafe (ES); Alberto Arana Hidalgo, Getafe (ES); Melania Sanchez Perez, Getafe (ES); Carlos Garcia Nieto, Getafe (ES); Jesus Javier Vazquez Castro, Getafe (ES); Edouard Menard, Getafe (ES); Fernando Iniesta Lozano, Getafe (ES); Maria Almudena Canas Rios, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 568 days.

(21) Appl. No.: 16/442,688

(22) Filed: Jun. 17, 2019

(65) Prior Publication Data
US 2019/0382096 A1 Dec. 19, 2019

(30) Foreign Application Priority Data

Jun. 19, 2018 (EP) ..................................... 18382442

(51) Int. Cl.
*B64C 1/26* (2006.01)
*B64F 5/10* (2017.01)

(52) U.S. Cl.
CPC . *B64C 1/26* (2013.01); *B64F 5/10* (2017.01)

(58) Field of Classification Search
CPC ... B64F 5/10; B64C 1/26; B64C 1/061; B64C 1/065; B64C 1/0685; B64C 3/182; B64C 3/185; B64C 5/06
See application file for complete search history.

(56) References Cited

U.S. PATENT DOCUMENTS

| 4,198,018 A * | 4/1980 | Brault ................ B29D 99/0003 |
| | | 428/116 |
| 2005/0151018 A1 | 7/2005 | Schoene |
| 2010/0148000 A1 | 6/2010 | Llamas Sandin et al. |

(Continued)

FOREIGN PATENT DOCUMENTS

EP 3078586 A1 10/2016

OTHER PUBLICATIONS

European Search Report; priority document.

*Primary Examiner* — Richard R. Green
*Assistant Examiner* — Colin Zohoori
(74) *Attorney, Agent, or Firm* — Greer, Burns & Crain, Ltd.

(57) ABSTRACT

A method for manufacturing a composite assembly with a continuous skin for a rear end of an aircraft by obtaining an upper part of the rear end by composite tooling. The upper part comprises a multi-spar vertical tail plane. The spars of the vertical tail plane comprise widening roots that form an upper shell of the rear end and an upper skin. Furthermore, a lower part comprises a lower shell of the rear end including semi-complete frames and stringers and a lower skin. The upper and lower parts are assembled with a joining procedure. The upper and lower skins are joined to obtain the composite assembly with the continuous skin.

8 Claims, 6 Drawing Sheets

(56) References Cited

U.S. PATENT DOCUMENTS

| | | | |
|---|---|---|---|
| 2011/0097554 A1* | 4/2011 | Kehrl | ............... B64C 1/064 29/419.1 |
| 2011/0290941 A1 | 12/2011 | Pina Lopez et al. | |
| 2014/0145031 A1 | 5/2014 | Moselage, III | |
| 2014/0145032 A1 | 5/2014 | Moselage, III | |
| 2016/0297510 A1 | 10/2016 | Folch Cortes et al. | |

* cited by examiner

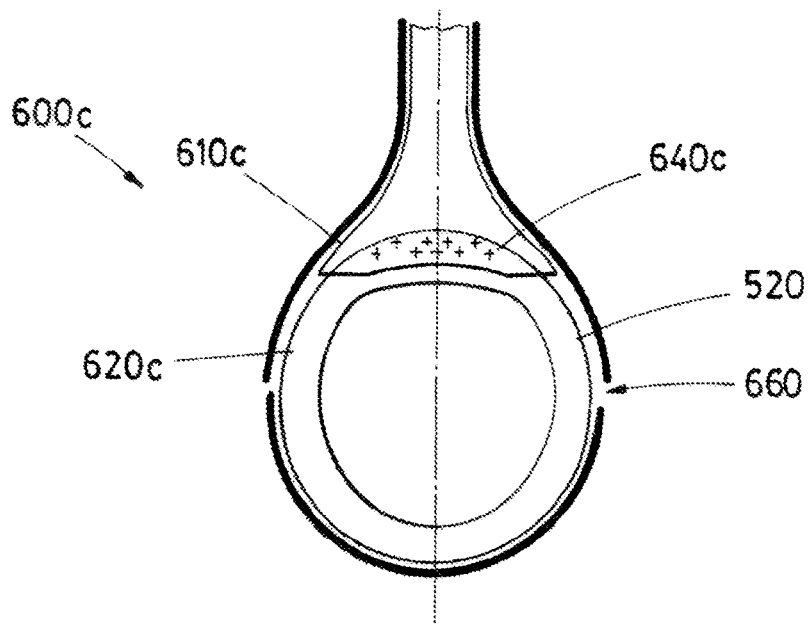
FIG.6C
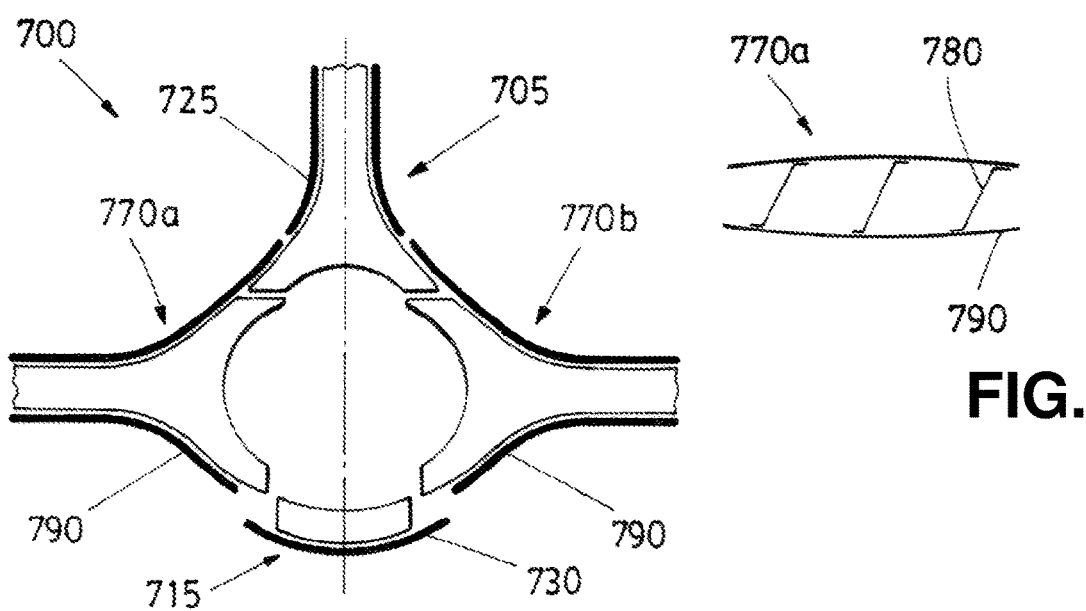
FIG. 7A
FIG. 7B

METHOD FOR MANUFACTURING A MULTI-SPAR BOX WITH A CONTINUOUS SKIN UPPER SHELL OF A TAIL CONE SECTION FOR A REAR END OF AN AIRCRAFT AND A COMPOSITE ASSEMBLY

CROSS-REFERENCES TO RELATED APPLICATIONS

This application claims the benefit of the European patent application No. 18382442.4 filed on Jun. 19, 2018, the entire disclosures of which are incorporated herein by way of reference.

FIELD OF THE INVENTION

The present invention refers to a manufacturing process for obtaining a composite assembly of a multi-spar box with a continuous skin upper shell of a tail cone section for a rear end of an aircraft having. The multi-spar box comprises at least an upper part with a "trumpet" shape having a multi-spar vertical tail plane VTP where the spars comprise a widening root with an appropriate curvature to form the upper shell of a tail cone section of the empennage of the aircraft and a lower part with a "u" shape that comprises the lower shell of the tail cone section including complete or semi-complete frames and stringers. Hence, the proposed manufacturing process integrates in one shot the trumpet-shaped part with the u-shape part with a continuous skin in order to obtain a fully integrated composite assembly of a multi-spar box for the rear end of the aircraft.

BACKGROUND OF THE INVENTION

Conventionally, to build an aircraft fuselage, a series of frames in the shape of the fuselage cross sections are held in position on a rigid fixture. These frames are then joined with the fuselage skin panels that include lightweight longitudinal elements called stringers that increase the buckling resistance of the skin. The stringers are attached to the skin by means of riveting, by cured resin or by bonding with special adhesives. The junction of the skin panels and the frames is performed by means of angular interface parts called shear ties that join the frame web and the fuselage skin, to conform the complete fuselage. In some cases, these angular parts can be part of the frame as an integrated flange.

The vertical tail plane, also known as empennage, is conventionally formed by a structural primary torsion box, a leading edge, a trailing edge and a movable surface. The primary box is formed by a skin, two or more spars and internal ribs. When the number of spars is sufficient, total of part of the ribs could be removed.

In known aircraft, the junction between the vertical tail plane and the fuselage rear section is performed by means of interface fittings to form the tail cone section. These fittings are responsible for transferring the continuum load distribution on the skins of the torsion box of the empennage, into punctual loads that are transferred to the frames of the fuselage. Frames then distribute the load to the fuselage skin.

The loads at those interface fittings are very high because they concentrate on punctual areas of the structure, leading to significant reinforcement and penalty weight for the fittings and surrounding elements. Additionally, the fittings need to be covered by aerodynamic fairings that produce a significant penalty of drag, and on assembly lead time.

Examples of interface fittings and associated aerodynamic fairing are shown on FIGS. 1A, 1B, 2 and 3.

Therefore, a new assembly of the empennage of an aircraft that includes at least the tail cone section and the vertical tail plane (and additionally the horizontal tail plane) with a continuous skin that solves the aforementioned drawbacks and methods for its manufacturing is desired.

SUMMARY OF THE INVENTION

With the manufacturing method according to the present disclosure, it is possible to obtain a composite assembly of a multi-spar box with a continuous skin upper shell of a tail cone section for a rear end of an aircraft. Several parts of the fuselage can be assembled by joint means in order to obtain the final assembly. In some examples, the composite assembly of the multi-spar box comprises a trumpet-shaped part that comprises a multi-spar vertical tail plane VTP where the spars comprise a widening root, with an appropriate curvature, to form the upper shell of the tail cone section and a u-shape part that comprises the lower shell of the tail cone section, including semi-complete frames and stringers. In other examples, the composite assembly of the multi-spar box comprises at least three trumpet-shaped parts that comprise a multi-spar vertical tail plane VTP and two multi-spar horizontal tail plane HTP, respectively.

Hence, in a preferred example, the present invention refers to a process for manufacturing a composite assembly of a multi-spar box with a continuous skin for a rear end of an aircraft. The multi-spar box comprises at least an upper part with a "trumpet" shape and a lower part with a "u" shape. The process obtains, in one shot, the trumpet-shaped part of the fuselage of the aircraft by composite tooling using a dedicated mold for the trumpet-shaped part. The trumpet-shaped part comprises a multi-spar vertical tail plane. The spars of the vertical tail plane comprise widening roots that form an upper shell of a tail cone section of the aircraft. Furthermore, the trumpet-shaped part comprises an upper skin.

To obtain the trumpet-shaped part, the multi-spar concept is used. In this process, the laminates are manufactured by a flat advanced fiber placement process, followed by hot forming process to obtain the final shape. This process uses a set of mandrels where the laminates are folded by means of pressure and temperature, and then the entire assembly is cured in an autoclave and, finally, demolded from a dedicated mold.

The process also obtains, in one shot, a u-shaped part of the fuselage by composite tooling using a dedicated mold for the u-shaped part. The u-shaped part comprises a lower shell of the tail cone section of the aircraft, where the lower shell also comprises semi-complete frames and stringers and a lower skin.

The process continues by assembling the trumpet-shaped part and the u-shaped part with a joining procedure selected from a plurality of different joining procedures and joining the upper skin and the lower skin to obtain the multi-spar box with a continuous skin.

Hence, the proposed assembly is a multi-spar concept assembly comprising at least the vertical tail plane (and potentially additionally the horizontal tail plane) and the tail cone section and it can be manufactured in one shot with a continuous skin.

The main advantage of this invention is that it allows to make the assembly process and tolerance management easier, thereby reducing the production lead time and recurring cost, because the result is a one-shot big component instead of producing the final part by joining many single parts with hundreds of fasteners. The skin cut can be done at different positions depending on the assembly needs, tolerances and thicknesses of the continuous skin.

Additionally, there are a lot of other advantages in manufacturing a composite assembly of the rear end of an aircraft with a continuous skin:

The loads are not transferred by means of interface fittings to discrete points as previously mentioned. In contrast, a transition surface between fuselage skin and the vertical tail plane skin allows a smooth load transmission between those surfaces, so that vertical tail plane skin loads can pass directly to the fuselage skin in a continuous manner without the need of interface fittings and without passing though the fuselage frames. As consequence, there is an important weight reduction due to the removal of the heavy fittings and their aerodynamic fairings. Also, the frames are much lighter because they do not transmit high loads from the fitting and because their dimension constrains due to the integration of interface fittings are also removed so that the frame height and thickness and associated weight can be significantly reduced.

Vertical tail plane fittings and the aerodynamic fairings can produce mechanical issues for fatigue, vibro-acoustics and debris impact, in the case the engine is placed on the rear part of the aircraft. In the proposed solution those parts and associated issues are removed, so the solution provides a structure with higher damage tolerance strength to fatigue, vibro-acoustics and impact, with significant advantages for such an aircraft configuration.

Finally, there is also an important aerodynamic drag reduction due to the removal of the fitting fairings, and providing an integrated smooth aerodynamic transition of the skin surface.

BRIEF DESCRIPTION OF THE DRAWINGS

For a better understanding of the above explanation and for the sole purpose of providing an example, some non-limiting drawings are included that schematically depict a practical embodiment.

FIGS. 6A, 6B and 6C show different joining procedures to assemble the trumpet-shaped part and the u-shaped part according to the present disclosure.

FIG. 7A shows an example of a multi-spar box with three trumpet-shaped parts.

FIG. 7B shows an enlarged cross section of a trumpet-shaped part of FIG. 7A.

DETAILED DESCRIPTION OF THE PREFERRED EMBODIMENTS

Figure 1A:
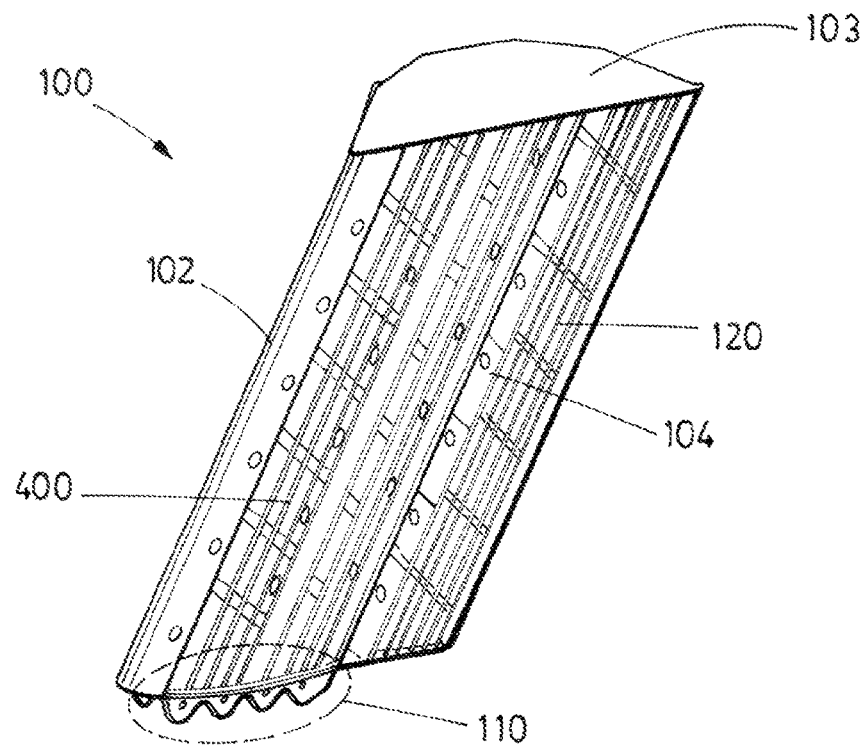
FIGS. 1A and 1B show a vertical tail plane and interface fittings comprising longitudinal load fittings and transversal load fittings of the vertical tail plane of an aircraft.
Figure 1B:
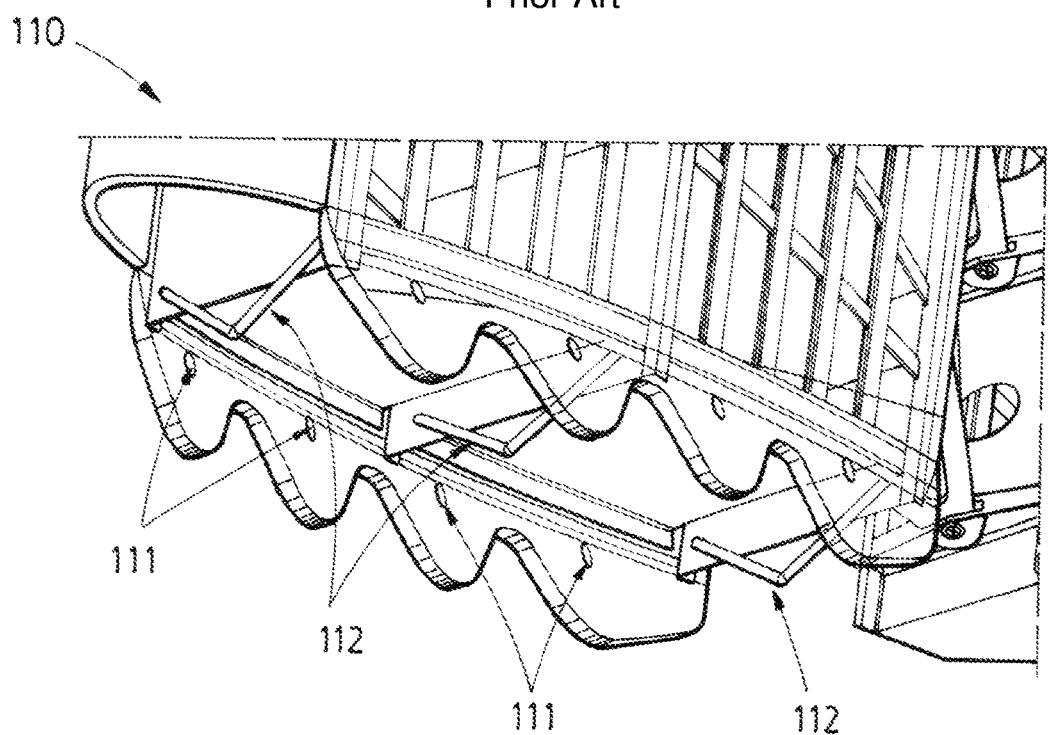

FIG. 1A shows a vertical tail plane (100). The vertical tail plane (100) comprises a multi-spar box (400), a leading edge (102), a trailing edge (104), a movable rudder (120), a tip (103) and interface fittings (110). FIG. 1B shows the interface fittings (110) divided into longitudinal load fittings (111) and transversal load fittings (112) of a conventional vertical tail plane of an aircraft.

Figure 2:
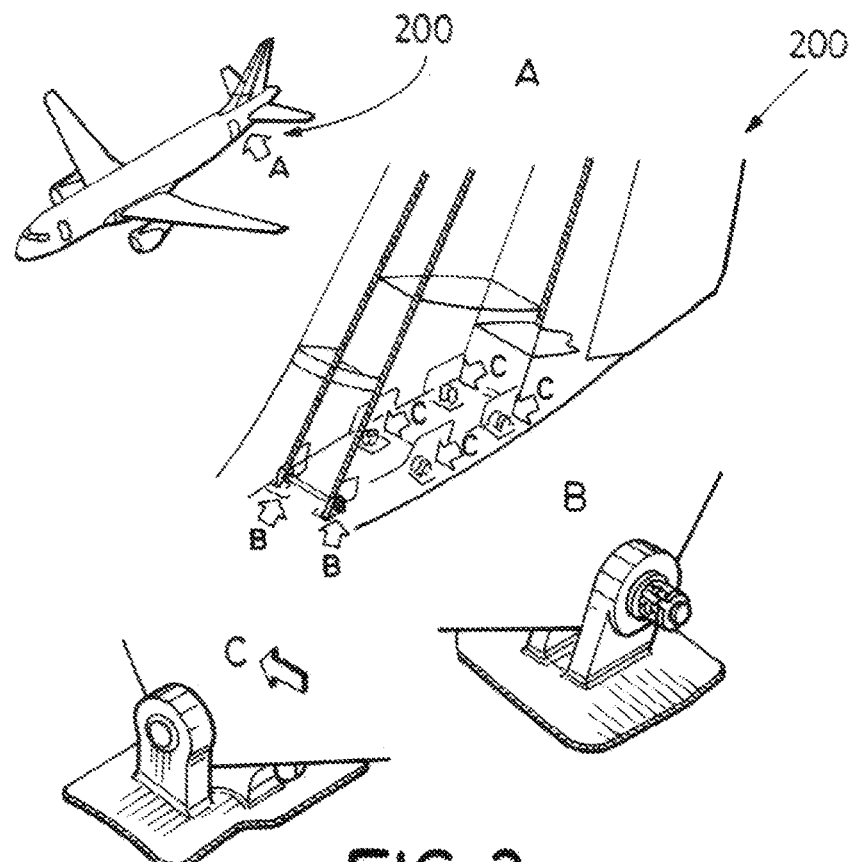
FIG. 2 shows examples of conventional vertical tail plane lugs and lateral attachments.

FIG. 2 shows examples of conventional vertical tail plane lugs and lateral attachments (200).

Figure 3:
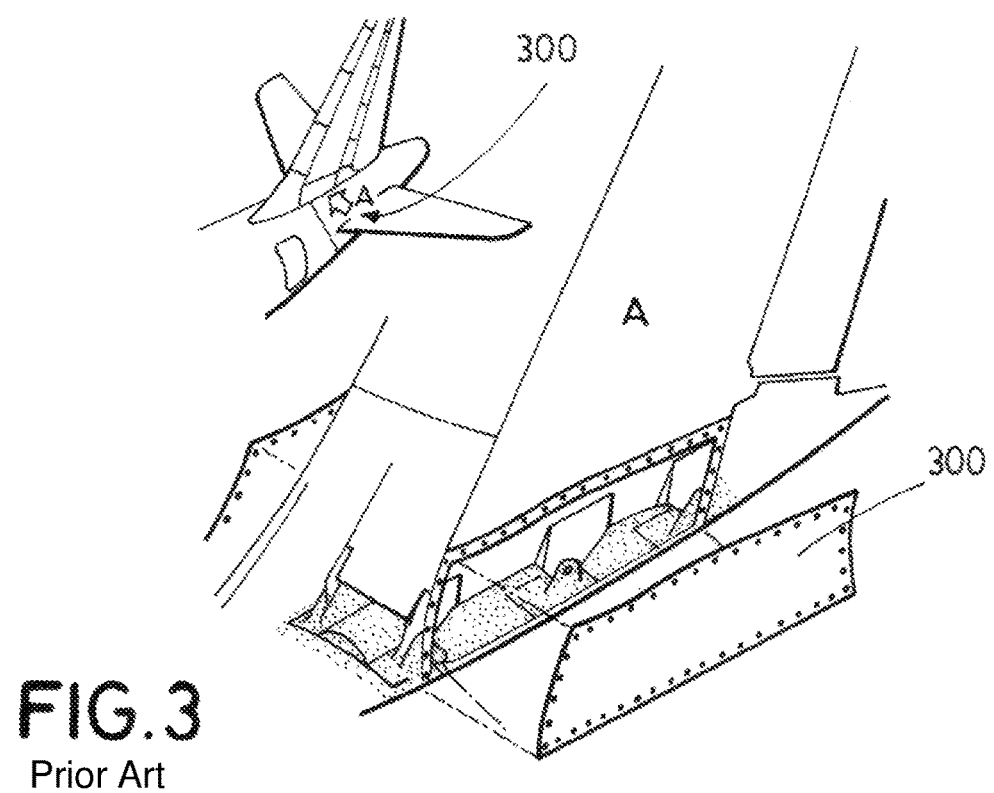
FIG. 3 shows conventional fairings to cover interface fittings as shown in FIGS. 1A and 1B.

FIG. 3 shows conventional fairings (300) to cover interface fittings as the ones shown in FIGS. 1A and 1B.

Figure 4A:
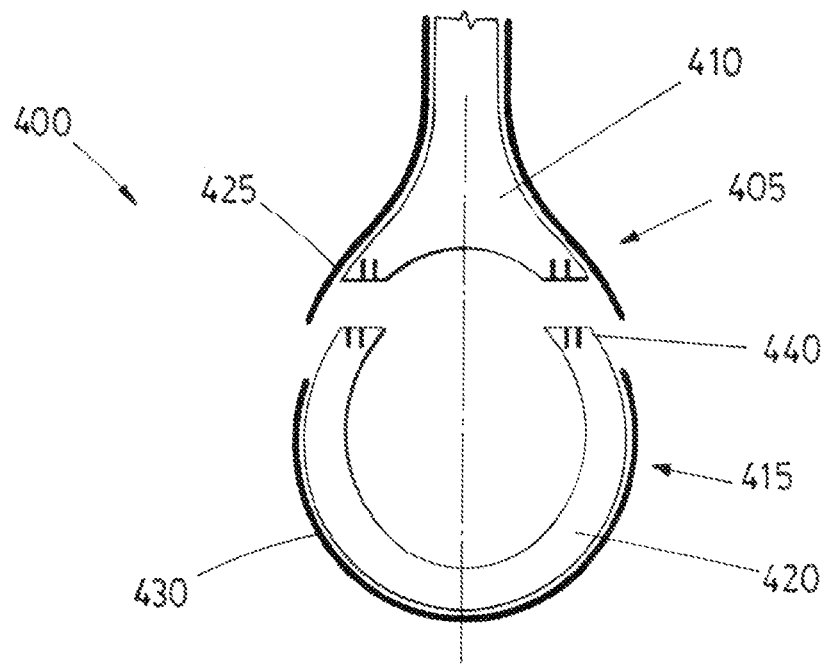
FIGS. 4A and 4B show a multi-spar box comprising a trumpet-shaped part and a u-shaped part according to the present disclosure.
Figure 4B:
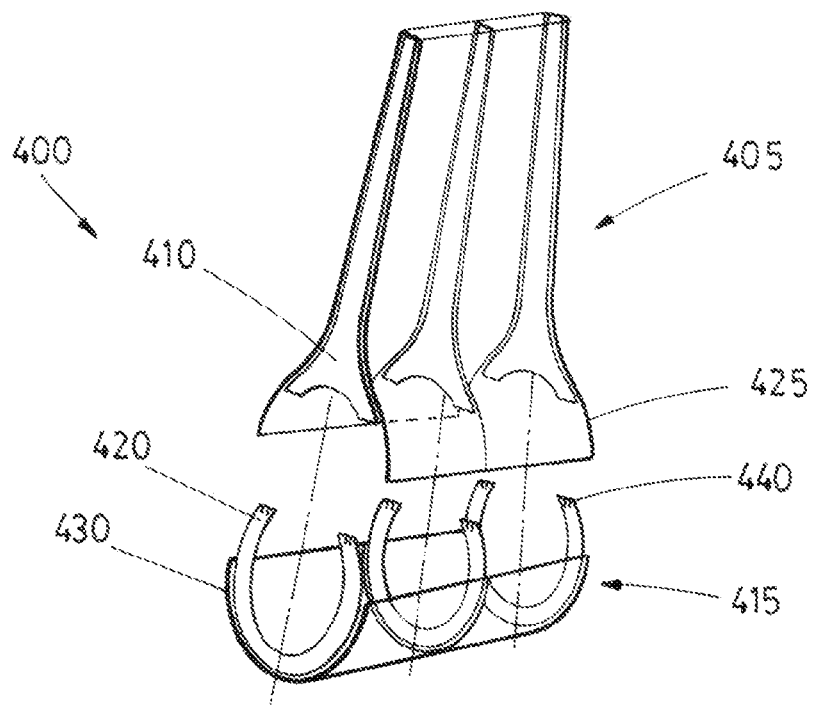

FIGS. 4A and 4B, show a multi-spar box comprising a trumpet-shaped part and a u-shaped part according to the present disclosure. In particular, FIG. 4A shows a multi-spar box (400) according to the present disclosure. The multi-spar box (400) comprises a trumpet-shaped part (405) that comprises a multi-spar vertical tail plane VTP with spars (410) having a widening root with an appropriate curvature to form the upper shell of a tail cone section of the aircraft which can be more appreciated in FIG. 4B. The trumpet-shaped part (405) further comprises an upper skin (425).

FIG. 4B shows that the multi-spar box (400) further comprises a u-shaped part that comprises the lower shell (415) of the tail cone section including semi-complete frames (420) and stringers (not shown in the figure). Furthermore, the multi-spar box (400) further comprises a lower skin (430). Both FIGS. 4A and 4B show joint means (440) for assembling the trumpet-shaped part and the u-shaped part in order to obtain, in one shot, a fully integrated composite assembly with a continuous skin for the rear end of the aircraft.

Figure 5A:
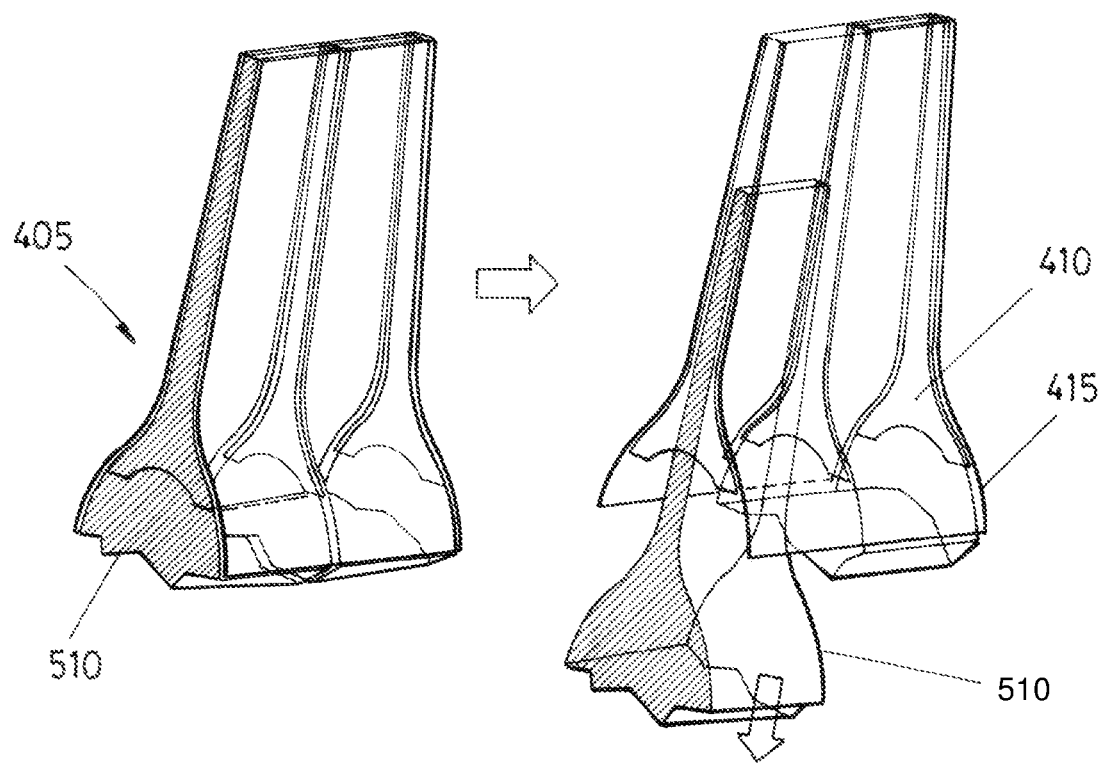
FIGS. 5A and 5B show demolding processes for the trumpet-shaped part and the u-shaped part.
Figure 5B:
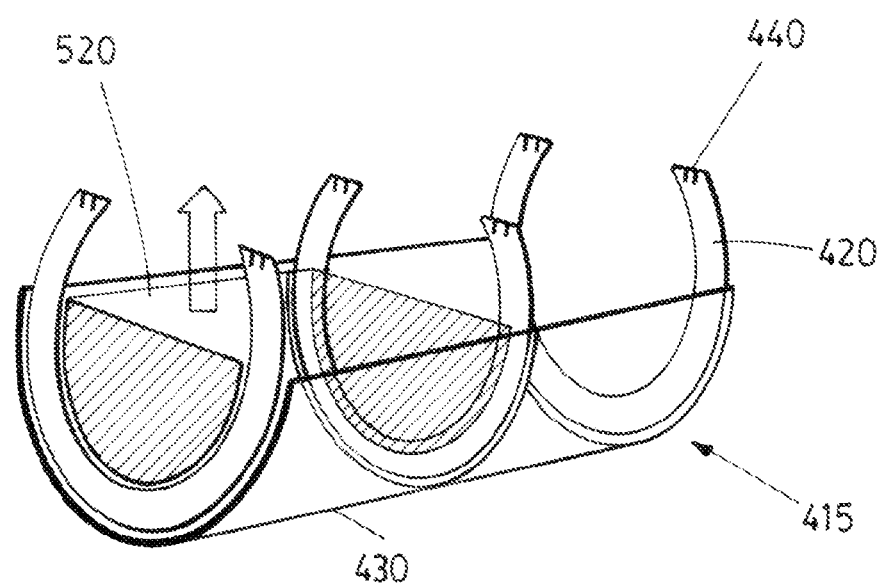

FIGS. 5A and 5B show the demolding processes performed while assembling the trumpet-shaped part and the u-shaped part by the joint means. FIG. 5A shows the trumpet-shaped part (405) obtained by composite tooling, which includes a demolding step shown in the figure wherein the dedicated mold (510) is demolded after a curing process in autoclave to obtain the "trumpet" shape of the vertical tail plane defining the upper shell of the tail cone section of the aircraft. Furthermore, the spars have a widening root with an appropriate curvature to form said upper shell of the tail cone section of the aircraft.

FIG. 5B shows the u-shaped part (415) obtained by composite tooling, which includes a demolding step shown in the figure wherein the dedicated mold (520) is demolded after a curing process in the autoclave to obtain the lower shell of the tail cone section that includes, in this example, semi-complete frames (420) and stringers (not shown in the figure) and joint means (440). In another example, the u-shaped part (415) of can comprise complete frames as shown in FIG. 6C.

Figure 6A:
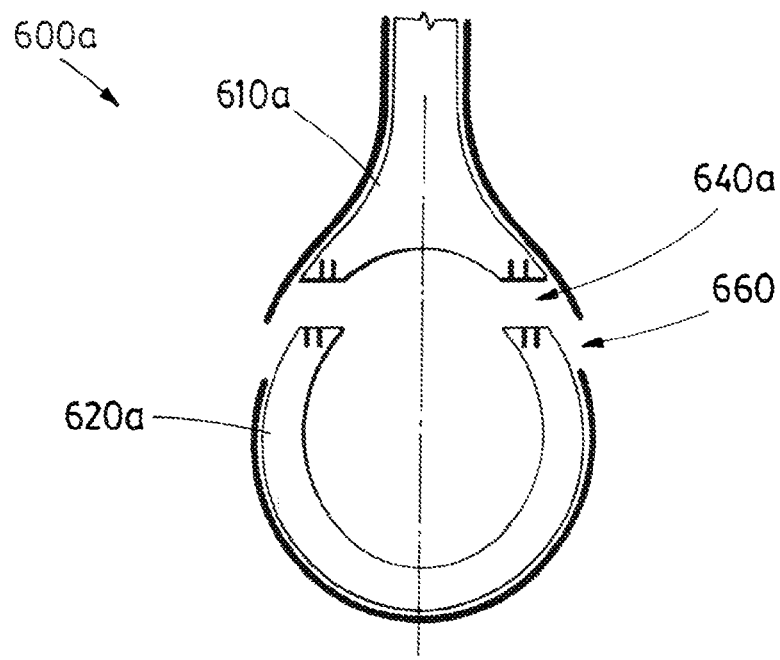
Figure 6B:
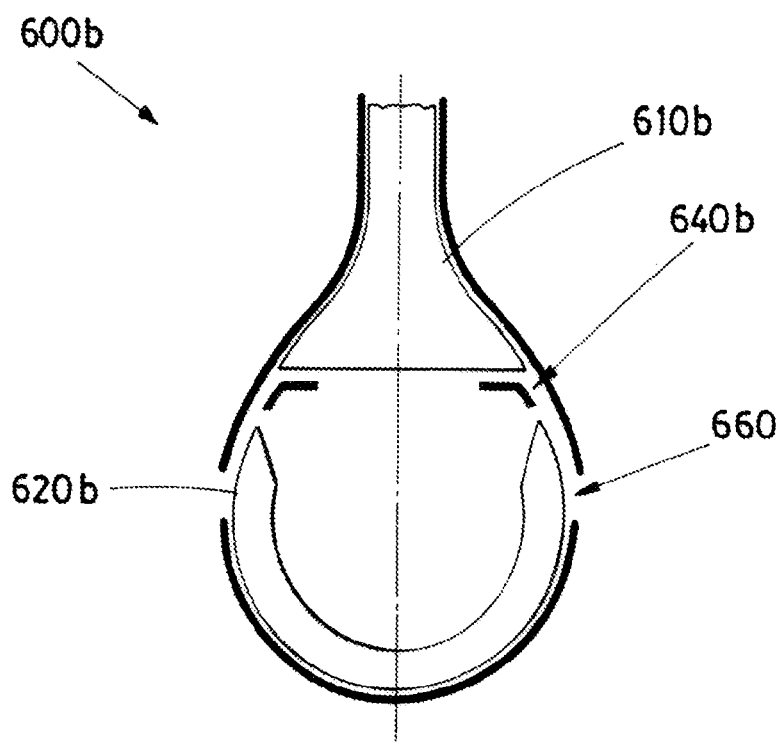

FIGS. 6A, 6B and 6C show joint procedures between the aforementioned two parts, i.e., the trumpet-shaped part and the u-shaped part.

FIG. 6A shows the assembly (600a) having a trumpet-shaped part with spars (610a) and a u-shaped part with semi-complete frames (620b). The widening roots of the spars (610a) are joined to the semi-complete frames (620a) with tension bolts (640a) to form the complete frames of the tail cone section. The upper skin and the lower skin are joined by shear joints at the skin cut (660).

FIG. 6B shows the assembly (600b) with a trumpet-shaped part having spars (610b) and a u-shaped part having semi-complete frames (620b). The widening roots of the spars (610b) and the semi-complete frames (620b) are joined by shear joints (640b) to form complete frames of the tail cone section. In this example, the complete frames and the spars (610b) of the trumpet-shaped part (as part of the VTP)

of the assembly (600b) are not coincident. The upper skin and the lower skin are joined by shear joint at the skin cut (660).

FIG. 6C shows the assembly (600c) with a trumpet-shaped part having spars (610c) and a u-shaped part having complete frames (620c). The widening roots of the spars (610c) and the complete frames (620c) are joined with shear joints (640c). This example of assembly causes overlapping between the widening roots of the spars (610c) and the complete frames (620c) increasing the resilience of the assembly. The upper skin and the lower skin are joined by shear joint at the skin cut (660).

FIG. 7A shows another example of a multi-spar box (700) according to the present disclosure and comprising parts (705), (715), (770a) and (770b). The process for manufacturing this multi-spar box (700) comprises a further step for obtaining a second and third trumpet-shaped parts (770a) and (770b) that are integrated with an upper trumpet-shaped part (705) and a bottom part (715). The second and third trumpet-shaped parts (770a, 770b) are obtained by composite tooling using a dedicated mold (not shown).

The second and third trumpet-shaped parts (770a) and (770b) each comprise a horizontal tale plane HTP of the rear section of the aircraft having spars (780) (FIG. 7B) and an intermediate skin (790). The second and third trumpet-shaped parts (770a) and (770b) can be manufactured as trumpet-shaped multi-spar composite assemblies. Hence, the VTP and HTP of the multi-spar fuselage sections are continuous skin multi-spar "trumpet" concepts manufactured in one shot with their respective spars roots enlarged to form the tail cone section of the rear end of the aircraft.

FIG. 7B shows that in the second and third trumpet-shaped parts (770a) and (770b), in the HTP, the "trumpets" must have slanted spars (780) to fit the VTP's spars inclination of the upper trumpet-shaped part (705).

The bottom part (715) of the tail cone section fuselage is manufactured in a separated part with the skin section (730) and the frames integrated. The bottom part (715) is the last one to be assembled in order to allow easy access to the interior of the tail cone section and to the VTP in the upper trumpet-shaped part (705) and the HTPs in the second and third trumpet-shaped parts (770a) and (770b). Also, this lower part is easy to replace in case of a tail strike event of the rear section of the fuselage of the aircraft. The second and third trumpet-shaped parts (770a) and (770b) are assembled to the upper trumped-shaped part (705) and bottom part (715) in the intersection between the VTP in the upper trumpet-shaped part (705) and the lower shell in the u-shaped part (715) with one of the joining procedures shown in previous FIGS. 6A-6C. The continuous skin comprises the skin sections (725), (730) and (790).

With the configuration of the multi-spar box (700) the number of parts are reduced and the assembly of the VTP and the HTP is simplified respect to the state of the art configurations. Also, the manufacturing of the three stabilizers in one shot with a continuous skin multi-spar configuration has aforementioned benefits with respect to known processes.

Even though reference has been made to a specific embodiment of the invention, it is obvious for a person skilled in the art that the lightning protector described herein is susceptible to numerous variations and modifications, and that all the details mentioned can be substituted for other technically equivalent ones without departing from the scope of protection defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a composite assembly with a continuous skin for a rear end of an aircraft, the method comprising:
    obtaining an upper part of the rear end by composite tooling, the upper part comprising:
        a vertical tail plane having multiple spars;
            wherein the spars of the vertical tail plane comprise widening roots that form an upper shell of the rear end; and
        an upper skin;
    obtaining a lower part of the rear end by composite tooling, the lower part comprising:
        a lower shell of the rear end including non-circumferential frames and stringers; and
        a lower skin;
    assembling the upper part and lower part with a joining procedure, wherein each spar is attached to a corresponding non-circumferential frame to form a circumferential frame; and
    joining the upper skin and lower skin to obtain the composite assembly with the continuous skin.

2. The method for manufacturing a composite assembly according to claim 1, wherein obtaining the upper part of the rear end comprises obtaining the multi-spar vertical tail plane by a multi-spar process comprising at least advanced fiber placement and hot forming.

3. The method for manufacturing a composite assembly according to claim 1, wherein obtaining the upper part comprises adding a lay-up of the upper skin.

4. The method for manufacturing a composite assembly according to claim 1, wherein obtaining in one shot by composite tooling the lower part comprises performing adding a lay-up of the lower skin.

5. The method for manufacturing a composite assembly according to claim 1, wherein assembling the upper part and the lower part by a joining procedure comprises performing the following joining procedure:
    joining the spars and semi-complete frames by the widening roots of the spars with tension bolts to form frames of a tail cone section of the rear end, and
    joining the upper skin and the lower skin with shear joints.

6. The method for manufacturing a composite assembly according to claim 1, wherein assembling the upper part and the lower part by a joining procedure comprises performing the following joining procedure:
    joining the spars and semi-complete frames by the widening roots of the spars with shear joints to form frames of a tail cone section of the rear end, wherein the frames and the spars of the vertical tail plane are not coincident; and
    joining the upper skin and the lower skin by shear joint.

7. The method for manufacturing a composite assembly according to claim 1, wherein assembling the upper part and the lower part by a joining procedure comprises performing the following joining procedure:
    joining the spars and semi-complete frames by the widening roots of the spars with shear joints, wherein the semi-complete frames overlaps with the widening roots of the spars; and
    joining the upper skin and the lower skin by shear joint.

8. The method for manufacturing a composite assembly according to claim 1, further comprising:
    obtaining first and second intermediate parts by composite tooling, the first and second intermediate parts each comprise:
        a multi-spar horizontal tail plane; and
        an intermediate skin; and
    assembling the first and second intermediate parts in an intersection between the vertical tail plane of the upper part and the lower part with the joining procedure,
    joining the upper skin, the lower skin and the intermediate skin to obtain the composite assembly with the continuous skin,
    wherein the spars of the horizontal tail planes of the first and second intermediate parts and the spars of the vertical tail plane of the upper part are slanted to an identical angle.

\* \* \* \* \*